United States Patent [19]

Potter et al.

[11] Patent Number: 4,972,084

[45] Date of Patent: Nov. 20, 1990

[54] CARRIER FOR A SAMPLE FOR ASSAY IN A SCINTILLATION COUNTER

[76] Inventors: Colin G. Potter, 12 Beech Rd. Headington; Gerald T. Warner, Staverton Pullen's Field, both of Oxford, England

[21] Appl. No.: 457,702

[22] PCT Filed: May 18, 1989

[86] PCT No.: PCT/GB89/00542
§ 371 Date: Jan. 8, 1990
§ 102(e) Date: Jan. 8, 1990

[87] PCT Pub. No.: WO89/11664
PCT Pub. Date: Nov. 30, 1989

[30] Foreign Application Priority Data

May 19, 1988 [SE] Sweden ................................ 8801879

[51] Int. Cl.$^5$ .......................... G01T 1/20; G01T 1/203; G01T 1/204
[52] U.S. Cl. ................................. 250/328; 250/483.1; 250/361 R; 250/364
[58] Field of Search .................... 250/328, 303, 361 R, 250/483.1, 364

[56] References Cited

U.S. PATENT DOCUMENTS

| | | | |
|---|---|---|---|
| 4,298,796 | 11/1981 | Warner et al. | 250/328 |
| 4,657,696 | 4/1987 | Thomson | 252/301.17 |
| 4,692,266 | 9/1987 | Costa et al. | 250/364 |
| 4,728,792 | 3/1988 | Warner et al. | 250/328 |
| 4,754,138 | 6/1988 | Edelstein et al. | 250/328 |
| 4,916,320 | 4/1990 | Wunderly et al. | 250/483.1 |
| 4,933,554 | 1/1990 | Lehtinen et al. | 250/328 |

FOREIGN PATENT DOCUMENTS 0212450 3/1987 European Pat. Off. .

*Primary Examiner*—Constantine Hannaher
*Assistant Examiner*—Edward J. Glick
*Attorney, Agent, or Firm*—Fred Philpitt

[57] ABSTRACT

A carrier for at least on beta-particle-emitting sample to be measured in a scintillation counter comprises a sorption sheet on which the sample is to be deposited, a transparent bag within which the sorption sheet with the sample is to be contained, and a scintillant to be contacted with the sample within said bag. According to the invention the scintillant is a meltable solid scintillant which is coated onto at least part of the sorption sheet and/or the inside of the transparent bag, and which is to be melted to envelop and permeate the sample before measurement thereof.

14 Claims, No Drawings

CARRIER FOR A SAMPLE FOR ASSAY IN A SCINTILLATION COUNTER

BACKGROUND OF THE INVENTION

This invention relates to a carrier for carrying at least one sample, and preferably a plurality of samples, containing beta-particle-emitting material to be assayed by means of a scintillation counter, and a scintillant to be contacted with the sample(s).

More especially, the invention relates to such a carrier which comprises a sorption sheet on which the or each sample is to be deposited and a transparent container within which the sorption sheet having the sample deposited thereon is to be introduced.

U.S. Pat. No. 4,298,796 describes a sorption sheet in the form of a filter mat bearing a plurality of samples which is placed in a transparent container adapted to contain a liquid, solid or gel scintillant. When a liquid scintillant is used, there is the danger that the samples might diffuse into the scintillant away from the sample area or might otherwise be displaced by the addition and dispersal of the scintillant when added to the container.

Furthermore, the photons of light produced by the beta-particle emitting material and counted by the scintillant counter have a tendency to pass between samples through the liquid scintillant ("crosstalk").

U.S. Pat. No. 4,298,796 also describes the possibility that the filter mat itself may be composed of a scintillant, for example scintillant glass fibres. However, there would be difficulties associated with the manufacture and maintenance of the physical properties needed for a filter formed of a solid scintillant alone.

In order to minimise diffusion or migration of the samples on the sorption sheet and at the same time minimise optical crosstalk between samples when measured, U.S. Pat. No. 4,728,792 proposed the use of a sorption sheet comprising barriers extending through at least a portion of the thickness of the sheet. When conducting an assay of the beta-particle-emitting samples, the sorption sheet according to that patent is sealed in a transparent bag with enough liquid scintillant to soak the whole sheet. As with the filter mat according to U.S. Pat. No. 4,298,796 the sorption sheet according to U.S. Pat. No. 4,728,792 still requires the use of a quantity of liquid scintillant, although considerably less than when using vials in a conventional liquid scintillation counter. Furthermore, the liquid scintillant has to be spread throughout the mat while in the bag, and this tends to cause cross-contamination of the samples. Besides the aspect of costs, handling liquid scintillants is quite a messy job.

SUMMARY OF THE INVENTION

An object of the invention is to minimise the difficulties associated with the carriers so far used and provide a carrier which is easier to use.

In accordance with the invention, these objects are achieved by the use of a meltable solid scintillant.

Thus, the invention provides, according to one aspect, an assay kit comprising a sorption sheet for carrying at least one beta-particle-emitting sample to be tested and a meltable solid scintillant for contact with the or each sample. Preferably, the kit additionally comprises a transparent container, such as a transparent bag, in which the sorption sheet is to be housed during scintillation counting.

More preferably the meltable solid scintillant is provided on at least a part of the sorption sheet. Indeed, in an especially preferred embodiment, the whole of the sorption sheet is impregnated with the meltable solid scintillant.

According to another aspect the invention provides a carrier comprising a sorption sheet for carrying at least one beta-particle emitting sample to be tested, optionally, a transparent container, preferably a bag, in which the sheet is to be housed during scintillation counting, and a meltable solid scintillant on at least a part of the sorption sheet and/or at least a part of an inside surface of the transparent container at a position so as to be contactable with said sample.

Once molten, the meltable solid is able to at least partially envelop and permeate the or each sample before measurement thereof.

In respective embodiments of the invention the carrier comprises a sorption sheet and a transparent container, in which carrier, the solid scintillant is present on at least that part of the sorption sheet on which a sample is to be deposited, or the solid scintillant is present on at least that part of an inside surface of the transparent container which, on insertion of the sorption sheet therein, will contact a sample on the absorption sheet, or the same solid scintillant is present on both of the sorption sheet and an inside surface of the transparent container at least on those parts thereof which are to come into contact with a sample.

The solid scintillant may be applied by coating onto the surface the sorption sheet and/or transparent container.

In a preferred embodiment, the solid scintillant is applied to the sorption sheet by immersion thereof in a solution of the solid scintillant in a solvent for the scintillant, such as toluene, so that the solution of solid scintillant becomes distributed throughout, and permeates through, the sorption sheet. This enables the entire sorption sheet to be coated with the solid scintillant.

The carrier is particularly suitable for assay of a plurality of samples all present as discrete spots on an individual sheet.

Thus, melting of the solid scintillant in situ on the sorption sheet enables sufficient movement of the molten scintillant in and around the material to be assayed so as to fix it in position for efficient assay, while preventing any considerable migration of the scintillant which might cause cross-contamination between the samples.

Typically, the sorption sheet is a filter mat on which the sample or samples may be deposited using a suitable manifold or harvesting machine or by spotting the sample on the filter mat.

The invention also provides a method of preparing a carrier bearing at least one beta-particle emitting sample for assay thereof using a scintillation counter, which method comprises providing, on at least a part of a sorption sheet and/or at least a part of an inside surface of a transparent container into which the sorption sheet is to be inserted, a meltable solid scintillant, introducing the or each sample onto the sorption sheet, inserting the sorption sheet bearing the or each sample into the transparent container and heating the transparent container and sorption sheet therein so as to melt the solid scintillant and enable it to at least partially envelop the or each sample.

A preferred method embodying the invention comprises the following steps
(a) dissolving the solid scintillant in a solvent,
(b) impregnating the sorption sheet with the solution of the solid scintillant,
(c) drying the sorption sheet to provide a said sorption sheet throughout which the solid scintillant is distributed,
(d) filtering the beta-particle-emitting sample through the sorption sheet, preferably by spotting or using a cell harvesting machine,
(e) drying the sorption sheet,
(f) inserting the dried sorption sheet into a transparent bag, and
(g) passing the transparent bag containing the absorption sheet between heated rollers to melt the solid scintillant.

The transparent bag may be of a heat-sealable plastics material so that on application of heat by the rollers, the bag is sealed and at the same time the solid scintillant is melted.

By using a meltable solid scintillant and applying heat thereto, this enables the molten solid scintillant to at least partially envelop the sample. The efficiency with which this is achieved may be improved by the simultaneous application of heat and an optimum pressure (as when passing the sheet between heated rollers as described above), this method being highly effective in enabling the solid scintillant to envelop and permeate the sample.

This enables an enhanced energy transfer to be obtained from beta-particles emitted from the sample, thus resulting in an increased counting efficiency in comparision with hitherto known filters containing solid scintillants.

In such known filters, the sample material merely stays on the surface of the scintillant covered fibres, so that radiation other than in the direction of the fibre or another neighbouring fibre would not transfer energy to the scintillant and, therefore, would not be detected. Thus, by using a carrier embodying the present invention such difficulties can be overcome.

Suitable solid meltable scintillants for a carrier of the invention are those which are solid at room temperature and preferably up to about 40° C., but which melt at a temperature, preferably between about 40° C. and 110° C. inclusive. The solid scintillant more preferably has a melting point within the range 60°–90° C., especially about 80° C.

A particularly preferred solid scintillant is 2,5-diphenyl oxazole (PPO) having a melting point of about 50° C.

Other solid scintillants which may be used are [2-(4'-tert-butylphenyl)-5-(4'-diphenyl)-1,3,4 oxadiole](Butyl-PBD) and anthracene.

Preferably, the solid scintillant is applied to the sorption sheet as a solution thereof in a solvent which may be evaporated off easily such as toluene.

The sorption sheet, usually a filter mat, may be soaked in this mixture, after which the toluene may be evaporated in e.g. a stream of air until a thin layer of the solid scintillant remains on the surface of each fibre of the filter.

Fluorescent spectral shifters such as [1,4-di-(2-(5-phenyloxazolyl)-benzene] (POPOP) or [1,4-di(2-methylstyryl)-benzene] (Bis-MSB) may be incorporated into the scintillant, as in conventional practice for liquid scintillants, where it is necessary to suit the spectral response of the photodetectors in the liquid scintillation counter.

It is also possible to provide, on a carrier in accordance with the invention, a low melting-point solid, such as a tetramethylbenzene (TMB) for example durene (1,2,4,5-tetramethylbenzene) having a melting point at about 80° C., in which the solid scintillant is believed to form a solid solution. This may be merely incorporated in the solution of the solid scintillant before application thereof to the sorption sheet. This gives a higher counting efficiency at lower solid scintillant concentrations and improves adherence of the solid scintillant, dissolved in the solid solvent, to the sorption sheet.

It is believed that each of the meltable solid scintillant, the solid solvent therefor and the spectrum shifter all play a role in the scintillation process.

A typical preferred composition for the application of the meltable solid scintillant to a sorption sheet comprises, by weight of the composition, 1–5%, more preferably 2–4%, solid scintillant, 0.01–0.5%, more preferably 0.2–0.4%, spectrum shifter and 0–20%, more preferably 2–15%, especially 5–10%, and more especially about 5%, solid solvent for the scintillant, all dissolved in a suitable solvent such as toluene to 100%.

The amount of solid solvent is not particularly critical, but best results are achieved when as much solid solvent as possible is provided on the sorption sheet without incorporating so much as to adversely affecting the filtration capabilities thereof.

The composition is preferably applied to the sorption sheet in an amount such as to provide, by weight of the final coated sheet, 5–75%, more preferably 5–20%, solid scintillant, 0.1–8%, more preferably 0.5–2%, spectrum shifter and 0–60%, more preferably 30–50%, especially about 40%, solid solvent for the scintillant.

Methods of applying heat to fuse the solid scintillant include the use of electromagnetic radiation, a hot plate, an oven or, more preferably, heated rollers.

In a method particularly preferred in practice, heat is applied by the use of heated rollers commonly used for laminating documents. The absorption sheet is placed in a thin transparent plastic bag and this is placed between non-fusible coated sheets in a conventional manner before passing it through the rollers. The enclosure of the absorption sheet in a bag has the advantage of preventing contamination both of the sample by the atmosphere and the atmosphere, the scintillation counter and the laminating machine by the sample during the heating process and provides a mechanically resistant set of encapsulated samples which can be safely disposed of without possible leakage of scintillant or radioactivity.

When, as is usual, a transparent bag is used to house the absorption sheet, this may be of any of the materials and dimensions of bags conventionally employed when using a liquid scintillant. However, it is particularly advantageous to employ a transparent bag of a heat-fusible plastics material to enable heat sealing of the bags as described above.

The absorption sheet may be any filter mat used in conventional carriers for samples to be assayed by means of a scintillation counter such as a fibrous mat, a porous membrane, an apertured film or porous cellular foam and may be made, for example of glass fibres or fibres of synthetic plastics material such as polypropylene or acrylic fibres, or may be a porous sheet, especially a porous membrane, of plastics material such as a polypropylene, acrylic polymer, polyvinyl chloride, polyethylene, cellulose ester or nylon.

If the filter mat is of a material having a low melting point, such as polypropylene, then on application of heat, such as by passage through heated rollers, each of the solid scintillant, filter mat and any plastic bag employed may be fused to form a composite which is very safe and convenient for disposal.

A carrier in accordance with the invention may be employed for assay of any sample containing beta-particle-emitting material and conventionally assayed by means of a scintillation counter.

Typically the samples contain particles ranging in size from one to several microns, such as cells.

A typical sample would be a lysate of cells washed through the filter mat and thereby deposited thereon.

For example, the carrier is eminently suitable for proliferating $^3$H-thymidine-labelled cells to be assayed.

The carrier is particularly suitable for carrying fragments which may be less than whole cells, for example, pieces of membrane for assay of the extent to which radioactive labelled ligands are bound to receptors on the membrane.

Thus, when using a liquid scintillant there is a tendency for this to cause separation of the ligands from the receptors. This tendency is minimised using a meltable solid scintillant-coated carrier in accordance with the invention.

Although a carrier in accordance with the invention may carry a single sample assay, the benefits of the invention are realised to the greatest extent when the carrier bears a plurality of samples all on the same filter mat.

A typical filter mat will bear, say, 96 discrete samples, each being about 1 cm in diameter, all individually fixed on the filter mat and isolated from one another by the meltable solid scintillant.

The counting efficiency which can be attained using a liquid scintillant on individual samples is higher than can be achieved using a solid meltable scintillant.

However, as mentioned above the use of liquid scintillants involves the use of large quantities. When attempting to reduce this amount by providing a plurality of samples, then cross-contamination and optical crosstalk between respective samples tends to occur during assay, while when using a scintillant which remains solid, the low counting efficiency makes measurement difficult and unreliable.

When using a carrier in accordance with the invention impregnated with a solid meltable scintillant, the counting efficiency is enhanced to a level sufficiently high for reliable measurement, while minimising crosstalk and cross-contamination.

It should be remembered that since scintillation counting often involves comparison between a standard sample and a sample to be tested, the actual counting efficiency need not be particularly high, provided that it is constant for each sample measured.

For example, by heat-treating glass fibre filters coated with meltable solid scintillant and bearing cells labelled with $^3$H-thymidine, a counting efficiency of about 13% has been attained.

When using a polypropylene filter which fuses on heating to the transparent bag to form a composite of solid-scintillant coated filter and bag, a counting efficiency of about 20% for $^3$H-thymidine labelled cells was attained.

DESCRIPTION OF PREFERRED EMBODIMENTS

The invention will now be described in more detail with reference to the following Examples.

IMPREGNATION OF THE FILTER MAT

EXAMPLE 1

A glass fibre filter sheet, 10"×4" (about 25×10 cm), weighing 1.7 g was impregnated with 15 mls of a solution comprising, by weight of the solution,

|  | % |
| --- | --- |
| 2,5-diphenyloxazole(PPO)(solid scintillant) | 2.7 |
| 1,4-di-2-methylstyryl benzene (MSB) (spectrum shifter) | 0.3 |
| toluene | up to 100% |

The sheet was dried in a current of air to provide a filter mat impregnated with 0.45 g solids (0.405 g PPO and 0.045 g MSB), i.e. about 20% by weight of the coated filter mat of solids.

EXAMPLE 2

The glass fibre filter sheet of Example 1 was impregnated with 15 mls of a solution comprising, by weight of the solution

|  | % |
| --- | --- |
| PPO | 2.7 |
| MSB | 0.3 |

The sheet was dried in a current of air to provide a filter mat impregnated with about 1.2 g solids, i.e. about 35% solids by weight of the coated filter mat.

EXAMPLE 3

A polypropylene fibre sheet, 10"×4" (about 25×10 cm), being somewhat thicker than that of Example 1 and weighing 2.8 g, was impregnated with the same solution as that of Example 2, but containing 10% TMB instead of 5% to provide a filter mat impregnated with about 2 g solids, i.e. about 40% solids by weight of the coated filter mat.

PREPARATION OF CARRIER FOR ASSAY

Proliferating lymphocyte cells were incubated with $^3$H-thymidine so as to incorporate this into the DNA of the cells. It was desired to assay the proliferation of the cells by measuring the uptake of thymidine.

The cells were separated from unincorporated thymidine by filtration onto the respective filter mats prepared in Examples 1–3.

The filtration was carried out using a cell harvester and provided 96 spots on each filter mat.

The filter mat was then dried in an oven and then placed in a transparent bag of heat-sealable plastics material.

The resultant assembly was passed between the heated rollers of an office laminator designed for lamination of documents.

This procedure sealed the transparent bag around the filter mat and at the same time fused the PPO (Example 1) or PPO and TMB (Examples 2 and 3) causing it to envelop and permeate the sample.

In each case, a sufficiently high counting efficiency (above 10%) was achieved on assay in a scintillation counter to enable a consistent and reliable assay.

Carriers embodying the invention such as those exemplified above enable a rapid, convenient, economical, simple and reliable scintillation counting assay to be performed.

The following additional advantages can be realized using such an embodiment, namely
(1) elimination of cross-contamination between respective samples on a filter mat,
(2) maintenance of liquid-receptor binding when assaying the extent of such binding,
(3) minimising optical crosstalk between respective samples on a filter mat during the counting procedure,
(4) minimising contamination of the samples by the atmosphere and of each of the scintillation counter, the laminating machine and the atmosphere in general by the sample, and
(5) the provision of a totally dry system fused within a plastic bag, enabling the formation of a neat solid package of waste ready for disposal.

We claim:

1. Carrier for at least one beta-particle-emitting sample to be measured in a scintillation counter, comprising a sorption sheet on which said at least one sample is to be deposited, a transparent bag within which the sorption sheet with said at least one sample is to be contained, and a scintillant to be contacted with said at least one sample within said bag, characterised in that said scintillant is a meltable solid scintillant which is coated onto at least part of the sorption sheet and/or the inside of the transparent bag, and which is to be melted to envelop and permeate said at least one sample before measurement thereof.

2. Carrier according to claim 1, wherein the solid scintillant is selected from 2,5-diphenyloxazole, anthracene and 2-(4'-tert-butylphenyl)-5-(4''-biphenyl)-1,3,4-oxadiazole.

3. Carrier according to claim 2, wherein the solid scintillant is dissolved in a solvent which is solid at room temperature.

4. Carrier according to claim 3, wherein the solvent is tetramethylbenzene.

5. Carrier according to claim 2, wherein the solid scintillant contains a spectrum shifter.

6. Carrier according to claim 5, wherein the spectrum shifter is 1,4-di-(2-methylstyryl)-benzene.

7. Carrier according to claim 1, wherein the sorption sheet is of a meltable material to be melted together with the meltable solid scintillant.

8. Carrier according to claim 3, wherein the sorption sheet material is selected from glass, polypropylene, an acrylic polymer, polyvinylchloride, polyethylene, cellulose esters and nylon.

9. A carrier for use in a scintillation counter and comprising
a sorption sheet for carrying at least one beta-particle-emitting sample to be tested,
optionally, a transparent container in which the sheet is to be housed during scintillation counting, and
a meltable solid scintillant on at least one of (a) at least a part of the sorption sheet and (b) at least a part of an inside surface of the transparent container at a position so as to be contactable with the said sample.

10. A carrier for use in a scintillation counter and comprising
a sorption sheet for carrying a plurality of beta-particle-emitting samples to be tested,
a transparent bag of heat sealable plastics material in which the sheet is to be housed during scintillation counting, and
a meltable solid scintillant impregnated within the sheet,
whereby, on heating the sorption sheet after deposition of the samples thereon and insertion in the transparent bag, the transparent bag is sealed to seal the sorption sheet within the container and the meltable solid scintillant is melted to at least partially envelop the sample, thereby fixing the samples and enhancing energy transfer from the beta particles emitted from the samples.

11. An assay kit comprising
a sorption sheet for carrying at least one beta-particle-emitting sample to be tested,
a meltable solid scintillant for contact with the said at least one sample, and
optionally, a transparent container in which the sorption sheet and solid scintillant are to be housed.

12. An assay kit according to claim 11, wherein at least a part of the sorption sheet which is to receive a said sample has the said meltable solid scintillant thereon.

13. An assay kit according to claim 12, wherein the meltable solid scintillant is impregnated throughout the entire sheet.

14. A method of preparing a carrier bearing at least one beta-particle-emitting sample for assay thereof using a scintillation counter, which method comprises providing, on at least one of (a) at least a part of a sorption sheet and (b) at least a part of an inside surface of a transparent container into which the sorption sheet is to be inserted, a meltable solid scintillant, introducing the said at least one sample onto the sorption sheet, inserting the sorption sheet bearing the said at least one sample into the transparent container and heating the transparent container and sorption sheet therein so as to melt the solid scintillant and thereby at least partially envelop the said at least one sample therewith.

* * * * *